March 6, 1962 H. L. VAN DER HORST ETAL 3,024,427
OSCILLATOR POWER CONTROL
Filed June 9, 1958

INVENTOR
HAJO LORENS VAN DER HORST
PETER HUBERTUS GERARDUS VAN VLODROP
BY
AGENT

United States Patent Office 3,024,427
Patented Mar. 6, 1962

3,024,427
OSCILLATOR POWER CONTROL
Hajo Lorens van der Horst and Peter Hubertus Gerardus van Vlodrop, Eindhoven, Netherlands, assignors to North American Philips Company, Inc., New York, N.Y., a corporation of Delaware
Filed June 9, 1958, Ser. No. 740,923
Claims priority, application Netherlands July 13, 1957
7 Claims. (Cl. 331—183)

The present invention relates to high frequency oven circuit arrangements. More particularly, the invention relates to high frequency oven circuit arrangements for high powers, for example, several tens of kilowatts, having a gaseous discharge tube for exciting an oscillatory circuit, the gaseous discharge tube having a control electrode, to which periodical ignition pulses derived from a separate relaxation generator are supplied.

The gaseous discharge tubes used in such high-frequency ovens may be of different types, for example, gaseous discharge tubes having a thermionic cathode and a grid-like control electrode, or gaseous discharge tubes having a mercury-pool cathode and a control electrode or ignition electrode arranged therein in an insulated manner.

An object of the invention is to provide an advantageous high-frequency oven of the kind mentioned in the preamble, in which inter alia a considerable saving of energy may be obtained with simple means and the component parts may have relatively small ratings.

According to the invention, a discharge tube connected to the relaxation circuit of the relaxation generator is controlled by a control voltage dependent upon the load on the high-frequency oven. The tube is responsive when the load on the high-frequency oven falls below a given threshold value, thus considerably increasing the relaxation time-constant of the relaxation generator.

In order that the invention may be readily carried into effect, two embodiments will now be described more fully, by way of example, with reference to the accompanying drawing, in which.

Figure 1:
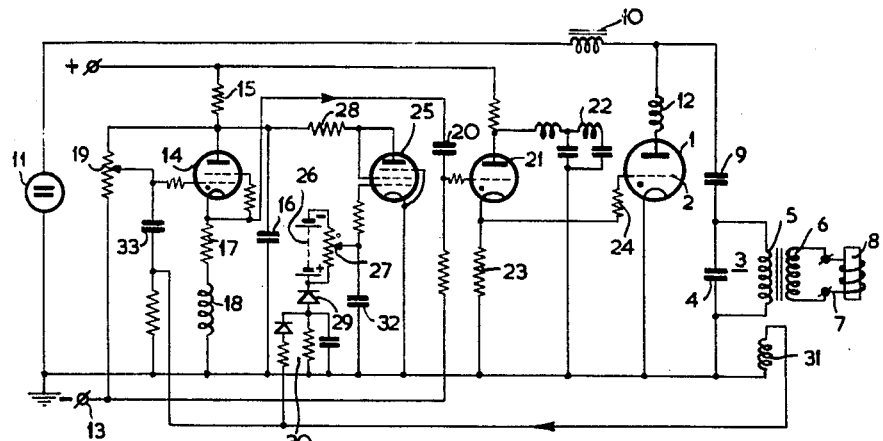
FIG. 1 shows a high-frequency oven according to the invention.

The high-frequency oven circuit arrangement shown in FIG. 1, which is designed, for example, for a power of 10 kilowatts, has a gaseous discharge tube 1, filled with hydrogen gas, having a control electrode 2 for exciting an oscillatory circuit 3 which includes a circuit capacitor 4 and a circuit coil 5. The circuit coil 5 is coupled to a coupling coil 6, which is connected to a load coil 7 containing a work-piece 8.

Connected in series with the oscillatory circuit 3 is a charging capacitor 9, which is connected via a choke coil 10 to a direct-current source 11 constituted, for example, by a three-phase rectifier, a coil 12 being included between the charging capacitor 9 and the anode of tube 1.

The gaseous discharge tube 1 is periodically ignited by ignition pulses supplied to the control electrode 2, resulting in the circuit capacitor 4 being charged via the coil 12 by the charging capacitor 9 and the energy in the oscillatory circuit 3 being set into oscillation. As soon as the anode voltage of tube 1 passes through zero as a result of the oscillation in circuit 3, the discharge produced extinguishes and the energy in the oscillatory circuit 3, apart from damping caused by the circuit and the load, can swing out freely until the gaseous discharge tube 1 is re-ignited by an ignition pulse and the above-described process is repeated.

For producing periodical ignition pulses, the high-frequency oven circuit arrangement includes a separate relaxation generator, which, in the embodiment shown, has a thyratron 14, normally cut off by a negative grid-bias source 13, the anode circuit of which includes a relaxation circuit constituted by a relaxation resistor 15 and a relaxation capacitor 16, whereas its cathode circuit includes the series-combination of a resistor 17 and a coil 18. The relaxation capacitor 16 is charged through the relaxation resistor 15 during each cycle at a charging speed determined by the time-constant of resistor 15 and capacitor 16, the sawtooth voltage produced across capacitor 16 being applied to the control grid of thyratron 14 through a voltage divider 19 included between capacitor 16 and the negative terminal of grid-bias source 13.

As soon as the ignition voltage of the thyratron 14 has been attained, the relaxation capacitor 16 discharges, resulting in a positive pulse across the cathode impedance 17, 18 of the thyratron 14, which is supplied via a blocking capacitor 20 to the control grid of a thyratron 21 connected as a pulse producer. The thyratron 21, which is normally blocked by means of a negative grid-bias provided by grid-bias source 13, has a delay line 22 included in the anode circuit, its cathode circuit including a resistor 23.

When a positive pulse occurs at the control grid of thyratron 21, the delay line 22 discharges through the thyratron, resulting in a positive rectangular pulse across cathode resistor 23, which is supplied as an ignition pulse via a series-resistor 24 to the control electrode 2 of gaseous discharge tube 1. The recurrence frequency of the ignition pulses is given by the relaxation time-constant of the relaxation generator and is, for example, 250 c./sec. in the embodiment shown.

According to the invention, a discharge tube included in the relaxation circuit 15, 16 of the relaxation generator is controlled by a control voltage dependent upon the load on the high-frequency oven. The discharge tube responds when the load on the high-frequency oven decreases below a given threshold value and hence causes the relaxation time-constant of the relaxation generator to be considerably increased. In the embodiment shown, the discharge tube comprises a pentode 25 which normally is blocked by a negative grid-bias, the negative grid-bias being derived from a voltage divider 27 connected parallel to a negative grid-bias source 26. The anode circuit of the pentode 25 includes a resistor 28 and the series-combination of pentode 25 and resistor 28 bridging the relaxation capacitor 16. Connected in series with the negative grid-bias source, via rectifier 29, is a rectifier stage 30 from which a control voltage of positive polarity dependent upon the load on the high-frequency oven is derived. The control voltage is obtained by rectification, in the rectifier stage 30, of a voltage derived from a coil 31 coupled to the circuit coil 5. The control-grid voltage of pentode 25 is derived from a capacitor 32 connected to the adjustable tapping on the voltage divider 27 and connected in parallel to rectifier cell 29 and rectifying stage 30, said control-grid voltage being equal to the sum of the voltage of the rectifying stage 30 and of the voltage derived from the grid-voltage source 26. The discharge time-constant of capacitor 32 in this case is several seconds.

When the described high-frequency oven is loaded by the work-piece 8, a considerable portion of the high-frequency energy in the oscillatory circuit is absorbed by the work-piece 8, a greatly damped oscillation occurring in the oscillatory circuit 3 so that the loss in this circuit is comparatively low. The value of the control voltage derived from rectifying stage 30 is then lower than the negative grid-bias of pentode 25 derived from the grid-bias source 26, the pentode 25 thus remaining cut off.

When the load on the high-frequency oven is decreased, the damping of the oscillations produced in oscillatory circuit 3 decreases, with the result that the loss in the circuit increases correspondingly to attain a maximum when the work-piece 8 has been removed out of the load coil 7. For example, the loss in the circuit has increased in this case by a factor from 5 to 10 with respect to that occurring upon normal load on the high-frequency oven.

The positive control voltage derived from rectifying stage 30 then increases and, for a certain minimum load on the high-frequency oven, exceeds the negative blocking voltage of pentode 25 provided by the negative grid-bias source 26. Thus, the pentode 25 becomes conducting and the relaxation time-constant of the relaxation generator is increased due to the resistance constituted by the series-combination of resistor 28 and the conductive pentode 25 being connected parallel to the relaxation capacitor 16. The recurrence frequency of the ignition pulses is thus reduced to less than $\frac{1}{10}$ of its original value and is now, for example, several c./sec.

It is thus ensured that in the unloaded state of the high-frequency oven, the useful output which is absorbed in the oscillatory circuit 3 as a mere loss, is reduced to a minimum value. If, starting from this condition, a work-piece is included in the load coil 7, the voltage at the rectifying stage 30 decreases below the negative grid-bias derived from the grid-bias source 26, so that pentode 25 is cut off and the ignition pulses again occur with the initial recurrence frequency of 250 c./sec.

By the use of the step according to the invention, on the one hand, a considerable saving of energy is attained and, on the other hand, the elements of the oscillatory circuit may be proportioned for a considerably lower power and, for example, reduced by a factor 3. The described control, whereby at the moment when the load decreases below a certain limiting value, the recurrence frequency of the ignition pulses is decreased, has the further important advantage that interfering survoltages are avoided, thus ensuring a smooth performance of the described device.

The specified step is applicable to high-frequency ovens in which at the time of the occurrence of an ignition pulse the oscillations in the oscillatory circuit are substantially damped or still have a considerable amplitude. In the latter case, it is necessary to ensure that a correct phase relation exists between the ignition pulses and the oscillations occurring in the oscillatory circuit 3. For this purpose, an alternating voltage provided by oscillatory circuit 5 is also supplied to the control grid of thyratron 14, so that ignition pulses derived from the relaxation generator cause ignition of the gaseous discharge tube at the moments when the anode voltage of the gaseous discharge tube constituted by the direct anode voltage and the superimposed alternating voltage of the circuit has a minimum value.

In the described circuit, this object is attained in a simple manner by applying the voltage derived from coil 31 via a capacitor 33 to the control grid of thyratron 14.

Figure 2:
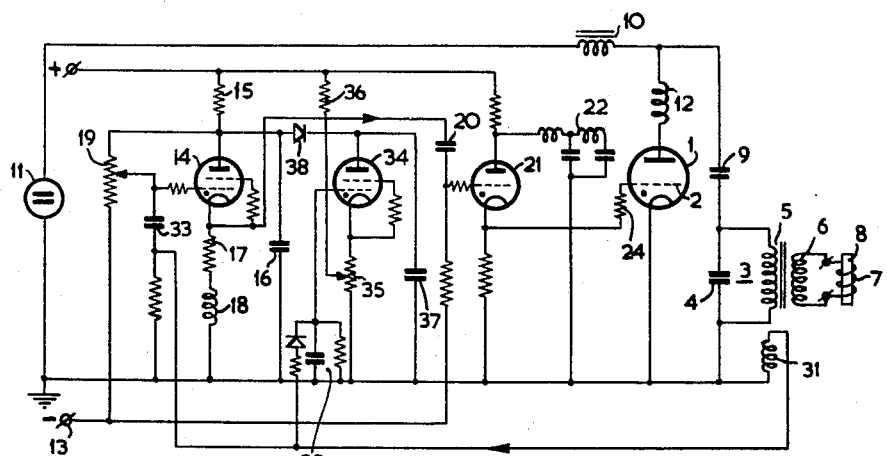
FIG. 2 shows a variant of the high-frequency oven of FIG. 1.

FIG. 2 shows a variant of the arrangement shown in FIG. 1. Identical elements are indicated by the same reference numerals.

In order to decrease the recurrence frequency of the ignition pulses at a minimum load on the high-frequency oven, the device shown utilizes a thyratron 34 in place of the pentode 25 of FIG. 1. The thyratron 34 normally is cut off by means of a positive cathode voltage which is applied to a resistor 35 included in the cathode circuit of the thyratron, via a resistor 36 connected to the positive supply voltage terminal. The control grid of thyratron 34 has applied to it the control voltage of positive polarity derived from rectifying stage 30 and dependent upon the load, a capacitor 37 being arranged in parallel to thyratron 34 and connected via a rectifying cell 38 to the relaxation capacitor 16. The capacitor 37 normally is charged via relaxation resistor 15, but cannot discharge through thyratron 14 upon ignition thereof as a result of the presence of rectifying cell 38.

When, in the arrangement of FIG. 2, the thyratron 34 is ignited by the control voltage applied to its control grid and dependent upon the load, the capacitors 16 and 37 discharge via the thyratron 34. The relaxation time-constant is thus increased due to the parallel combination of the capacitors 37 and 16 now being charged via the relaxation resistor 15, thus increasing the relaxation capacity due to the additional switching in of capacitor 37. With suitable proportioning of capacitor 37, the recurrence frequency of the ignition pulses may then be reduced to several c./sec.

Of an equipment extensively tested in practice, the following data are mentioned below:

Resistor 15: 1 megohm
Rectifying cell 38: Selenium rectifier Philips 250Y10
Capacitor 16: 0.0068 $\mu$f.
Capacitor 37: 0.3 $\mu$f.

What is claimed is:
1. A high frequency circuit arrangement comprising a gaseous discharge tube having an anode and a control electrode, means for supplying a direct voltage to said anode, a resonant circuit connected to said anode, a load circuit connected to said resonant circuit and including a load having a variable magnitude, means for periodically initiating the operation of said discharge tube at a given repetition rate thereby to periodically energize said resonant circuit at said rate, said last-mentioned means comprising an electrical discharge wave generator having a controllable operating frequency coupled to said control electrode, and means for decreasing the repetition rate at which said resonant circuit is energized when the magnitude of said load decreases, said last-mentioned means comprising means for producing a control signal having variations as determined by variations of the magnitude of said load, and means for applying said control signal to said wave generator thereby to vary the operating frequency of the wave generator.

2. A high frequency circuit arrangement comprising a gaseous discharge tube having an anode and a control electrode, means for supplying a direct voltage to said anode comprising an energy storing capacitor, a resonant circuit connected to said anode and said capacitor in series circuit arrangement, a load circuit connected to said resonant circuit and including a load having a variable magnitude, means for periodically initiating the operation of said discharge tube at a given repetition rate thereby to periodically discharge said capacitor through said resonant circuit at said rate, said last-mentioned means comprising a relaxation oscillator circuit comprising an electrical discharge device having output means coupled to said control electrode and having a controllable operating frequency, and means for decreasing the said repetition rate at which said capacitor is discharged through said resonant circuit when the magnitude of said load decreases, said last-mentioned means comprising means for producing a control signal having variations as determined by variations of the magnitude of said load, and means for applying said control signal to said relaxation oscillator circuit thereby to vary the operating frequency of the relaxation oscillator circuit.

3. A high frequency circuit arrangement comprising a gaseous discharge tube having an anode and a control electrode, means for supplying a direct voltage to said anode comprising an energy storing capacitor, a resonant circuit connected to said anode and said capacitor in series circuit arrangement, a load circuit connected to said resonant circuit and including a load having a variable magnitude, means for periodically initiating the operation of said discharge tube at a given repetition rate thereby to periodically discharge said capacitor through said resonant circuit at said rate, said last-mentioned means comprising a relaxation oscillator circuit comprising an electrical discharge device having output means coupled to said control electrode and having a controllable operating frequency determined by the relaxation time constant thereof, and means for decreasing the repetition rate at which said capacitor is discharged through said resonant circuit when the magnitude of said load decreases to values less than a predetermined value, said last-mentioned means comprising means for producing a control signal having variations as determined by variations of the load when the magnitude thereof is less than said predetermined value, and means for applying said control signal to said relaxation oscillator circuit thereby to vary the relaxation time constant thereof.

4. A high frequency circuit arrangement comprising a gaseous discharge tube having an anode and a control electrode, means for supplying a direct voltage to said anode comprising an energy storing capacitor, a resonant circuit connected to said anode and said capacitor in series circuit arrangement, a load circuit connected to said resonant circuit and including a load having a variable magnitude, means for periodically initiating the operation of said discharge tube at a given repetition rate thereby to periodically discharge said capacitor through said resonant circuit at said rate, said last-mentioned means comprising a second gaseous discharge tube having a control electrode and output means coupled to the control electrode of the first said gaseous discharge tube, a capacitor and an impedance connected to form a relaxation oscillator generating a first signal having a substantially sawtooth waveform and a second signal having a pulse waveform, said relaxation oscillator having an operating frequency as determined by the time constant of said capacitor and impedance, means for applying said first signal to the said control electrode of said second gaseous discharge tube, means responsive to said second signal for initiating the operation of said first-mentioned discharge tube, and means for decreasing the repetition rate at which said capacitor is discharged through said resonant circuit when the magnitude of said load decreases, said last-mentioned means comprising means for producing a control signal having variations as determined by variations of the magnitude of said load, means for varying the time constant of said relaxation oscillator comprising a voltage responsive impedance, and means for applying said control signal to said voltage responsive impedance.

5. A high frequency circuit arrangement as claimed in claim 4 wherein said voltage responsive impedance comprises an electron discharge tube having an anode and a cathode defining an electron discharge path and a control electrode, wherein said electron discharge path is connected in shunt with the capacitor of the said relaxation oscillator and wherein said control signal is supplied to the herein-mentioned control electrode.

6. A high frequency circuit arrangement as claimed in claim 4 wherein said voltage responsive impedance comprises a rectifier element and second capacitor connected in series circuit arrangement across the capacitor of the said relaxation oscillator and a gaseous discharge tube having a cathode and anode connected across the said second capacitor and having a control electrode, and wherein said control signal is supplied to the herein-mentioned control electrode.

7. A high frequency circuit arrangement comprising a gaseous discharge tube having an anode and a control electrode, means for supplying a direct voltage to said anode comprising an energy storaging capacitor, a resonant circuit connected to said anode and said capacitor in series circuit arrangement, a load circuit connected to said resonant circuit and including a load having a variable magnitude, means for periodically initiating the operation of said discharge tube at a given repetition rate thereby to periodically discharge said capacitor through said resonant circuit at said rate, said last-mentioned means comprising a second gaseous discharge tube having a control electrode and output means coupled to the control electrode of the first said gaseous discharge tube, a capacitor and an impedance connected to form a relaxation oscillator generating a first signal having a substantially saw-tooth waveform and a second signal having a pulse waveform, said relaxation oscillator having an operating frequency as determined by the time constant of said capacitor and impedance, means for applying said first signal to said control grid of said second gaseous discharge tube, means responsive to said second signal for initiating the operation of said first-mentioned discharge tube, and means for decreasing the said repetition rate at which said capacitor is discharged through said resonant circuit when the magnitude of said load decreases, said last-mentioned means comprising a pick-up coil coupled to said resonant circuit, rectifying means energized by said pick-up coil for producing a control signal having variations as determined by variations of the magnitude of said load, a voltage responsive impedance connected to said relaxation oscillator for varying the time constant thereof, and means for applying said control signal to said voltage responsive impedance.

References Cited in the file of this patent

UNITED STATES PATENTS

| | | |
|---|---|---|
| 2,475,063 | Thalner | July 5, 1949 |
| 2,508,321 | Wilmotte | May 16, 1950 |
| 2,733,340 | Garner et al. | Jan. 31, 1956 |
| 2,896,169 | Howell | July 21, 1959 |